US009555966B2

(12) United States Patent
Ejima

(10) Patent No.: US 9,555,966 B2
(45) Date of Patent: Jan. 31, 2017

(54) CONTROL APPARATUS, CONTROL SYSTEM AND CONTROL METHOD

(71) Applicant: Takeshi Ejima, Tokyo (JP)

(72) Inventor: Takeshi Ejima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 14/467,108

(22) Filed: Aug. 25, 2014

(65) Prior Publication Data
US 2015/0066202 A1    Mar. 5, 2015

(30) Foreign Application Priority Data

Aug. 28, 2013  (JP) ................................ 2013-176908
Jul. 25, 2014   (JP) ................................ 2014-152136

(51) Int. Cl.
| | | |
|---|---|---|
| *G06F 7/00* | (2006.01) | |
| *B65G 1/137* | (2006.01) | |
| *B65G 1/10* | (2006.01) | |
| *B65G 1/12* | (2006.01) | |
| *B65G 1/06* | (2006.01) | |
| *G06F 1/00* | (2006.01) | |
| *B65G 17/00* | (2006.01) | |

(52) U.S. Cl.
CPC ................ *B65G 1/137* (2013.01); *B65G 1/06* (2013.01); *B65G 1/10* (2013.01); *B65G 1/12* (2013.01); *B65G 17/00* (2013.01); *G06F 1/00* (2013.01)

(58) Field of Classification Search
None
See application file for complete search history.

(56) References Cited

U.S. PATENT DOCUMENTS

| | | | | |
|---|---|---|---|---|
| 3,910,439 A | * | 10/1975 | Ross ...................... | A01D 46/20 182/131 |
| 4,991,719 A | * | 2/1991 | Butcher ................ | B07C 5/3412 198/349.95 |
| 5,337,919 A | * | 8/1994 | Spaulding ............ | B65G 1/1373 221/127 |

(Continued)

FOREIGN PATENT DOCUMENTS

| | | |
|---|---|---|
| JP | H04-000882 | 1/1992 |
| JP | H10-320636 | 12/1998 |

(Continued)

*Primary Examiner* — Prasad Gokhale
(74) *Attorney, Agent, or Firm* — IPUSA, PLLC

(57) ABSTRACT

A control apparatus controls a circulating conveyor having areas each of which stores one of articles. A storage stores inventory information indicating a state of storage of each of the articles. A computer executes a program to perform a controlling process of controlling the conveyor. The controlling process includes a receiving process of receiving an instruction of storing or carrying out an article, a computing process of computing, in response to reception of the instruction by the receiving process, an amount of travel of the conveyor based on the inventory information, the amount of travel being necessary to move one of the areas of the conveyor to a predetermined position at which one of the articles is stored in or carried out of the one of the areas, and a first controlling process of controlling an operation of the conveyor in accordance with the computed amount of travel.

11 Claims, 11 Drawing Sheets

(56) References Cited

U.S. PATENT DOCUMENTS

| | | | |
|---|---|---|---|
| 6,685,401 B1* | 2/2004 | de Almeida Rodrigues | B65G 51/035 406/11 |
| 8,249,914 B2 | 8/2012 | Umeda | |
| 8,280,398 B2 | 10/2012 | Ishii et al. | |
| 2002/0032501 A1* | 3/2002 | Tilles | G07F 17/12 700/214 |
| 2011/0200420 A1* | 8/2011 | Driskill | G06Q 10/087 414/807 |
| 2014/0031972 A1* | 1/2014 | DeWitt | B65G 1/0421 700/214 |
| 2014/0058554 A1* | 2/2014 | Janet | B65G 49/00 700/214 |
| 2014/0063542 A1* | 3/2014 | Aoki | G06F 3/1296 358/1.15 |
| 2014/0109527 A1* | 4/2014 | Burri | G01N 35/00 53/476 |

FOREIGN PATENT DOCUMENTS

| | | |
|---|---|---|
| JP | 2005-158007 | 6/2005 |
| JP | 5056009 | 10/2012 |

* cited by examiner

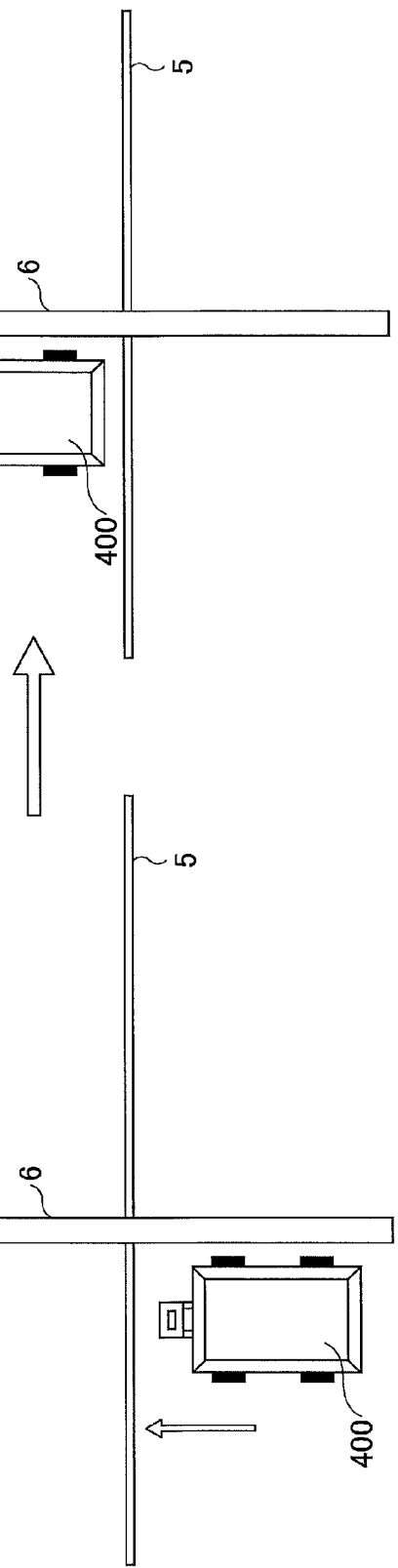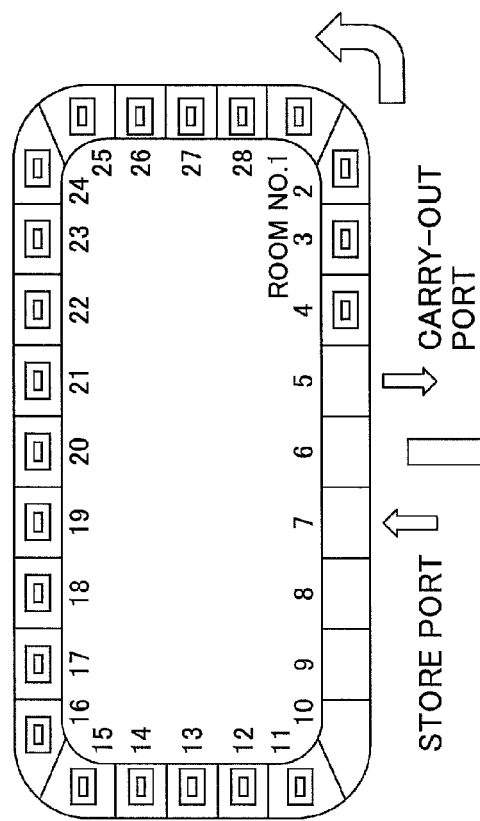

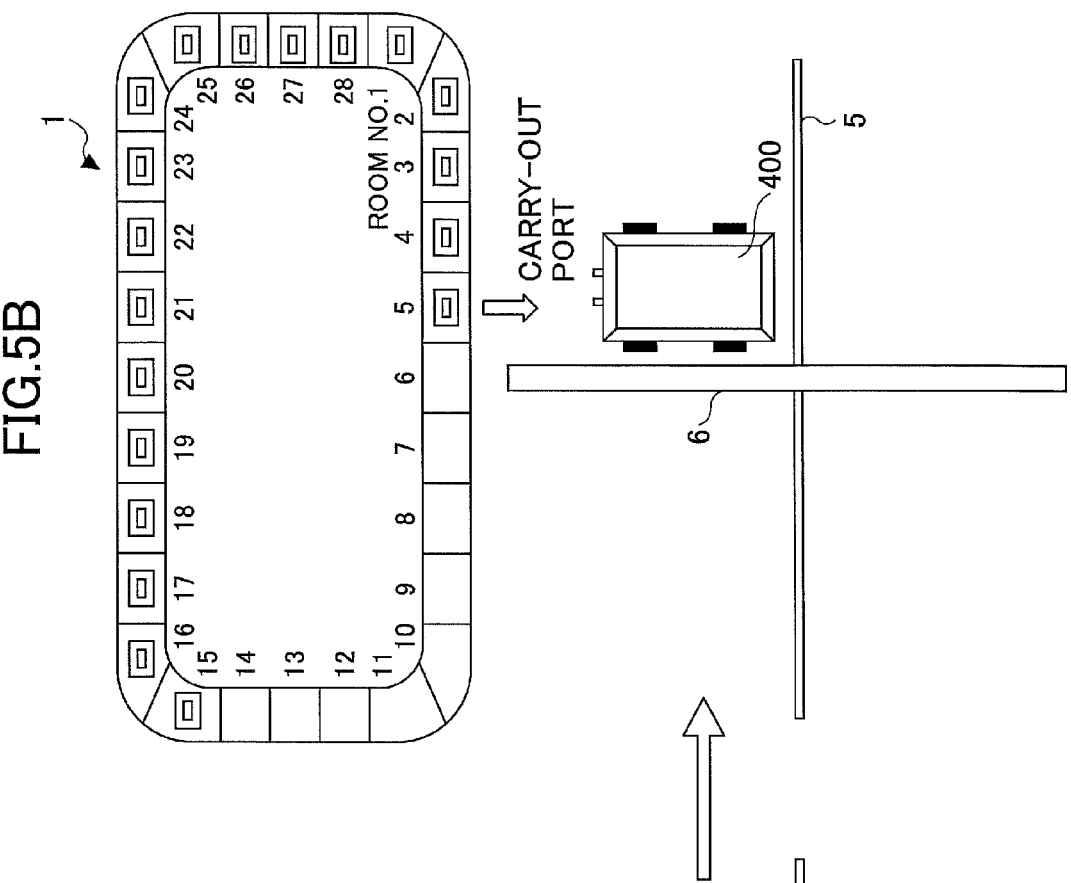
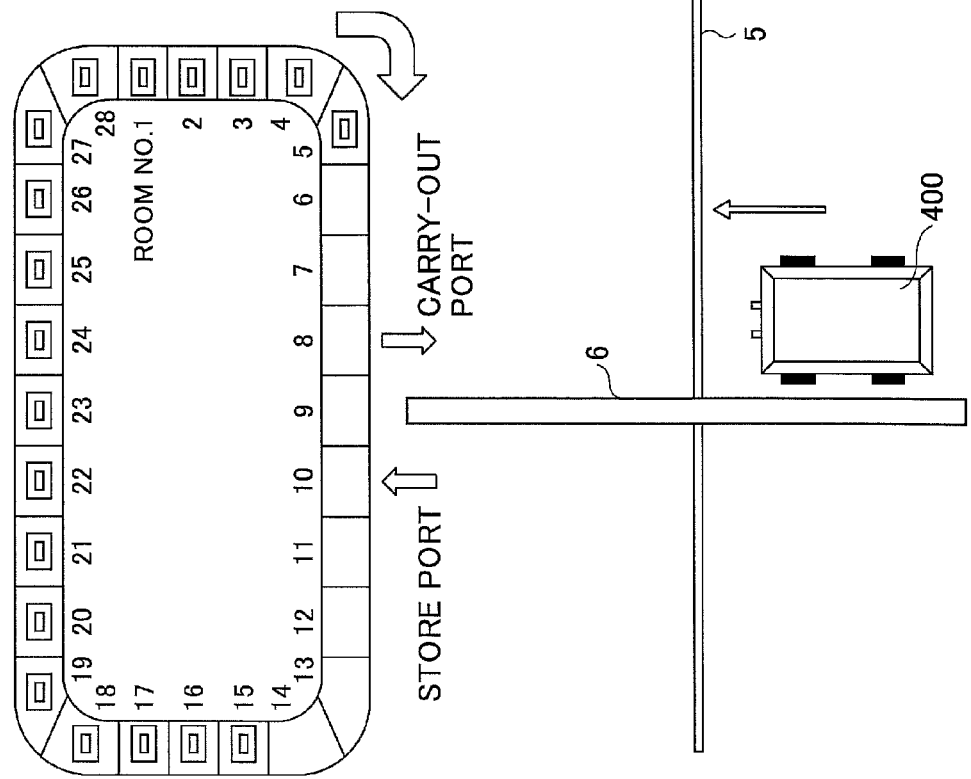
FIG.5B
FIG.5A

FIG.10

| IDENTIFICATION INFORMATION | STORE STATE |
|---|---|
| 1 | 1 |
| 2 | 1 |
| 3 | 1 |
| 4 | 1 |
| 5 | 0 |
| 6 | 0 |
| 7 | 0 |
| 8 | 0 |
| 9 | 0 |
| 10 | 0 |
| 11 | 1 |
| : | : |
| 25 | 1 |
| 26 | 1 |
| 27 | 1 |
| 28 | 1 |

FIG.11

| | IDENTIFICATION INFORMATION |
|---|---|
| STORE PORT | 7 |
| CARRY-OUT PORT | 5 |

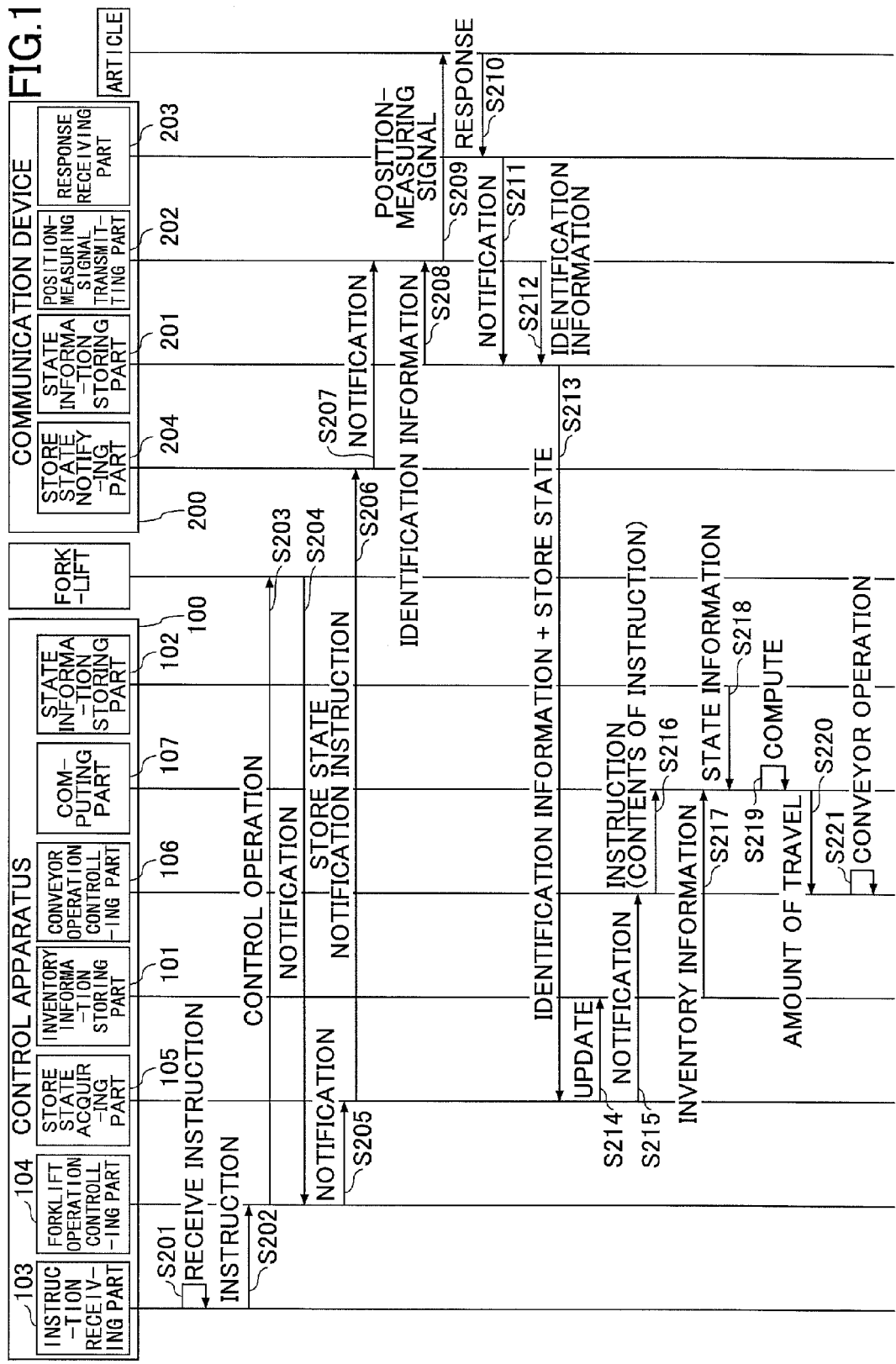

CONTROL APPARATUS, CONTROL SYSTEM AND CONTROL METHOD

CROSS-REFERENCE TO RELATED APPLICATION

The present application is based upon and claims the benefit of priority of Japanese Patent Applications No. 2013-176908 filed on Aug. 28, 2013, and No. 2014-152136 filed on Jul. 25, 2014, the entire contents of which are incorporated herein by reference.

BACKGROUND OF THE INVENTION

1. Field of the Invention

The present invention generally relates to a control apparatus, a control system and a control method.

2. Description of the Related Art

There are known various systems that automatically lend articles. For example, Japanese Laid-Open Patent Application No. H04-000882 discloses an automatic warehouse including a stationary shelf having many compartments and a movable body movable on a side surface of the stationary shelf. The movable body moves along the side surface of the stationary shelf to transfer articles stored in the compartments. In this automatic warehouse, two windows, which are a carry-out counter and a return counter, are provided on the side part of the stationary shelf. When an article to be stored is placed on the return counter, data of the compartment in which the article is to be stored is sent to and stored in a control apparatus. After completion of carrying-out a predetermined number of stored articles, a return signal is sent to the movable body based on the data stored in the control apparatus so as to return the article on the return counter to a predetermined storage room.

Moreover, Japanese Laid-Open Patent Application No. H10-320636 discloses an automatic lending facility equipped with a lending apparatus. The lending apparatus automatically lends an article stored in a storage part in response to a lending request, and automatically stores an article, which is returned in response to a return request, in the storage part. The automatic lending facility sets a time period from a time of lending an article until a reference unit time has passed as a return time corresponding to a lending fee.

In a warehouse managing articles for lending, it is desired to manage articles while strictly keeping the rule of the FIFO so that no deviation occurs in lending frequency between individuals of each article.

SUMMARY OF THE INVENTION

There is provided according to an aspect of the invention a control apparatus controlling a circulating conveyor having a plurality of areas each of which stores one of a plurality of articles, the control apparatus including: a storage storing inventory information indicating a state of storage of one of the article in each of the areas; and a computer executing a program to perform a controlling process of controlling an operation of the conveyor, wherein the controlling process includes: a receiving process of receiving an instruction of storing or carrying out one of the articles; a computing process of computing, in response to reception of the instruction by the receiving process, an amount of travel of the conveyor based on the inventory information, the amount of travel being necessary to move one of the areas of the conveyor to a predetermined position at which one of the articles is stored in or carried out of the one of the areas; and a first controlling process of controlling an operation of the conveyor in accordance with the amount of travel computed by the computing process.

There is provided according to another aspect of the invention a control system including: a control apparatus controlling a circulating conveyor having a plurality of areas each of which stores one of a plurality of articles; and a communication device provided in each of the areas, wherein the control apparatus includes: a storage storing inventory information indicating a state of storage of the article in each of the areas; and a computer executing a program to perform a controlling process of controlling an operation of the conveyor, wherein the controlling process includes: a receiving process of receiving an instruction of storing or carrying out an article; a computing process of computing, in response to reception of the instruction by the receiving process, an amount of travel of the conveyor based on the inventory information, the amount of travel being necessary to move one of the areas of the conveyor to a predetermined position at which one of the articles is stored in or carried out of the one of the areas; and a first controlling process of operating the conveyor in accordance with the amount of travel computed by the computing process, wherein the communication device transmits information regarding a state of storage of one of the articles in response to an instruction transmitted by the acquiring process.

There is provided according to a further aspect of the invention a control method executed by a control apparatus, which controls a circulating conveyor having a plurality of areas each of which stores one of a plurality of articles, the control method including: receiving an instruction of storing or carrying out an article; computing, in response to reception of the instruction by the receiving process, an amount of travel of the conveyor based on inventory information, the amount of travel being necessary to move one of the areas of the conveyor to a predetermined position at which one of the articles is stored in or carried out of the one of the areas; and controlling the conveyor to operate in accordance with the amount of travel computed by the process of computing.

Other objects, features and advantages of the present invention will become more apparent from the following detailed description when read in conjunction with the accompanying drawings.

The objects and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIGS. 4A and 4B are views for explaining an operation of the conveyor when storing an article;

FIGS. 5A and 5B are views for explaining an operation of the conveyor when carrying out an article;

FIG. 10 is an illustration of a table for storing inventory information;

FIG. 11 is an illustration of a table for storing status information;

FIG. 13 is a sequence chart of an operation of the control apparatus according to the embodiment of the present invention.

DETAILED DESCRIPTION OF THE EMBODIMENTS

A description will now be given, with reference to the drawings, of a control apparatus and a control system according to an embodiment of the present invention.

(Outline of System)

Figure 1:
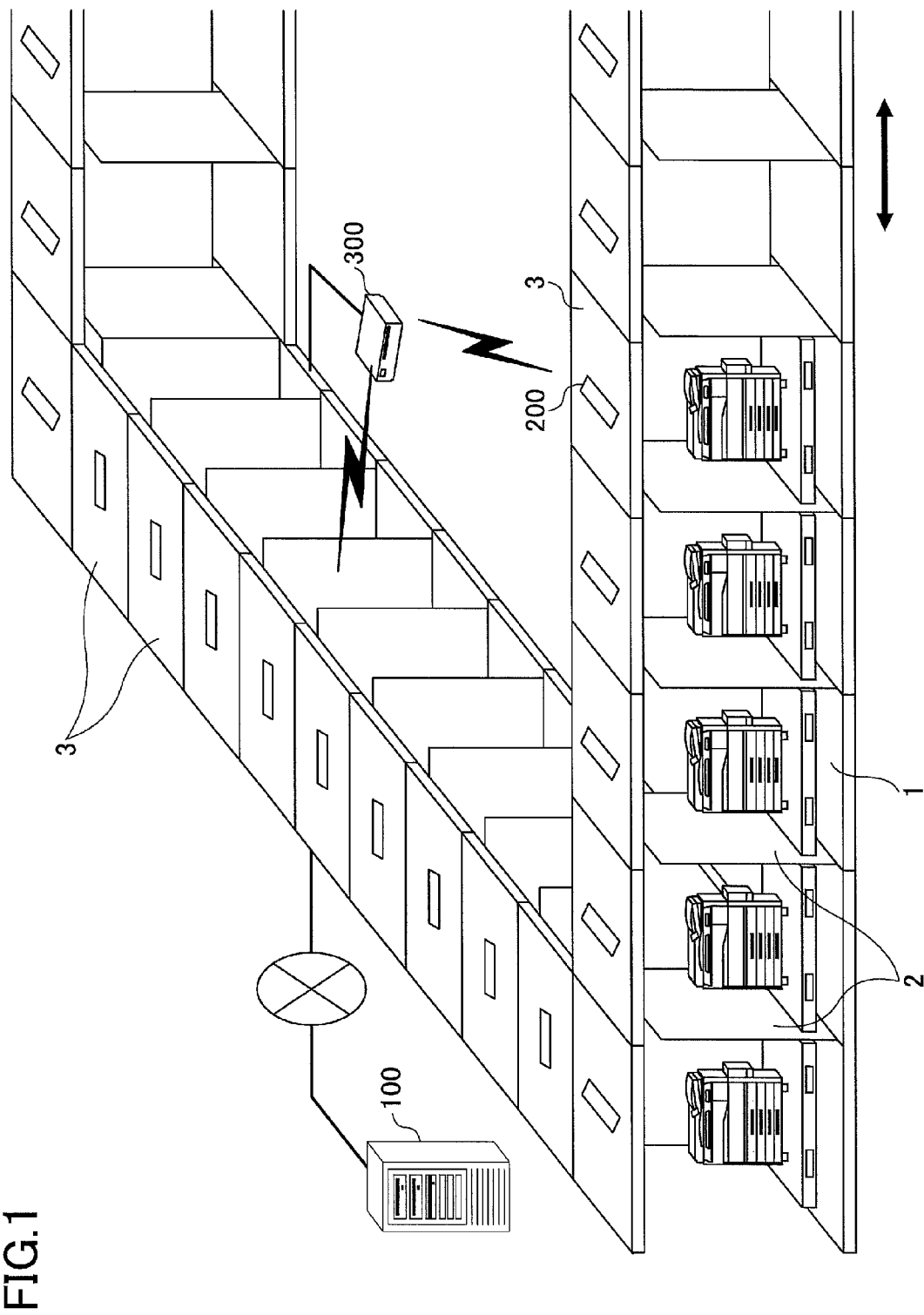
FIG. 1 is a perspective view of a part of a conveyor communicating with a control apparatus according to an embodiment of the present invention.

FIG. 1 is a perspective view of a part of a conveyor controlled by a control apparatus according to an embodiment of the present invention. FIG. 1 illustrates a circulating conveyor 1 having one or more rooms (areas) partitioned by partition boards 2 and a control apparatus 100 for controlling an operation of the conveyor 1. An LED illumination tube (not illustrated in the figure) in which a communication device 200 is incorporated is installed on a top board 3 of each room so as to detect a state of storage of articles in each room and send a result of detection to the control apparatus 100 by wireless communication through a gateway 300. It should be noted that the top boards 3 do not move when the conveyor 1 travels.

Here, the result of detection of a state of storage is information indicating whether any article is stored in the room. The communication device 200 sends a position-measuring signal to an article by using the IMES, which is an indoor position-measuring signal sending technique in order to recognize a state of storage of an article. The communication device 200 is capable of detecting storage of an article in the room by receiving a response from the article.

The communication device 200 and articles form a wireless network using the Bluetooth (registered trademark), the ZigBee (registered trademark), the WiFi (registered trademark) or the like so as to be capable of communicating with each other. Also, the communication device 200 and the gateway 300 form a wireless network using the Bluetooth (registered trademark), the ZigBee (registered trademark), the WiFi (registered trademark) or the like so as to be capable of communicating with each other. The communication device 200, articles and the gateway 300 together may form a single wireless network. The control apparatus 100 and the gateway 300 are connected by, for example, a local area network (LAN) so as to be capable of communicating with each other. The gateway 300 mutually connects the wireless network and the wired network to each other so as to play a role of relaying or converting the communication between the control apparatus 100 and the communication device 200.

Figure 2:
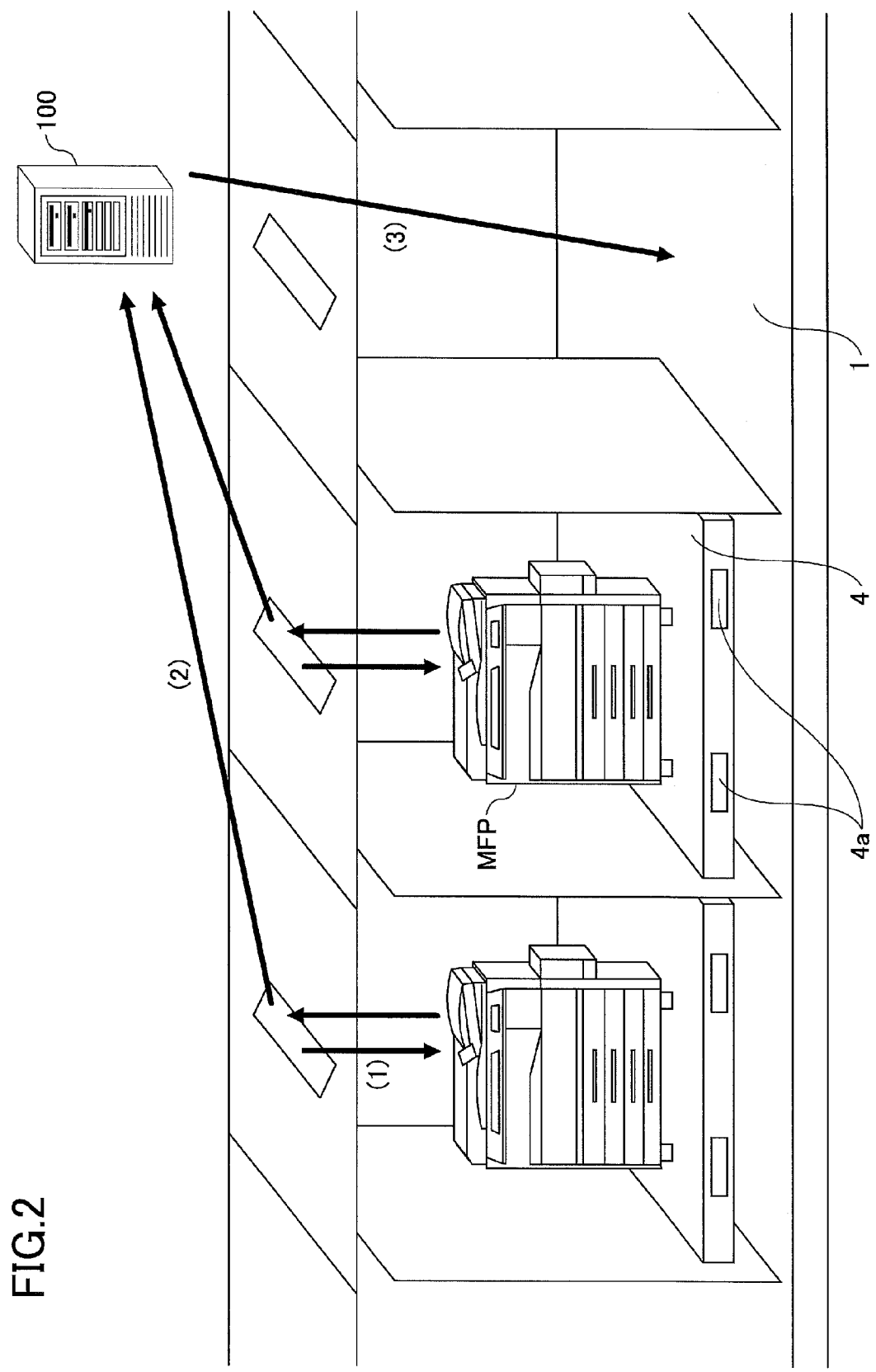
FIG. 2 is a perspective view of storage rooms (areas) in which articles are stored.

FIG. 2 illustrates exchange of information between the communication device 200, the articles and the control apparatus 100. First, (1) the communication device 200 sends a position-measuring signal according to the IMES to an article (for example, an information forming apparatus such as a multifunction peripheral (MFP)) placed on an article-placing board 4 having claw-plate insertion slots 4a into which a fork of a forklift is inserted. Then, upon receipt of a response from the article, the communication device 200 determines that the article is stored and (2) sends information regarding the determination and its own identification information to the control apparatus 100 by wireless communication through the gateway 300. Thereafter, (3) the control apparatus 100 sends a conveyor operation instruction to the conveyor 1 to operates the conveyor 1 in response to an instruction from a user to store or take out the article.

Figure 3:
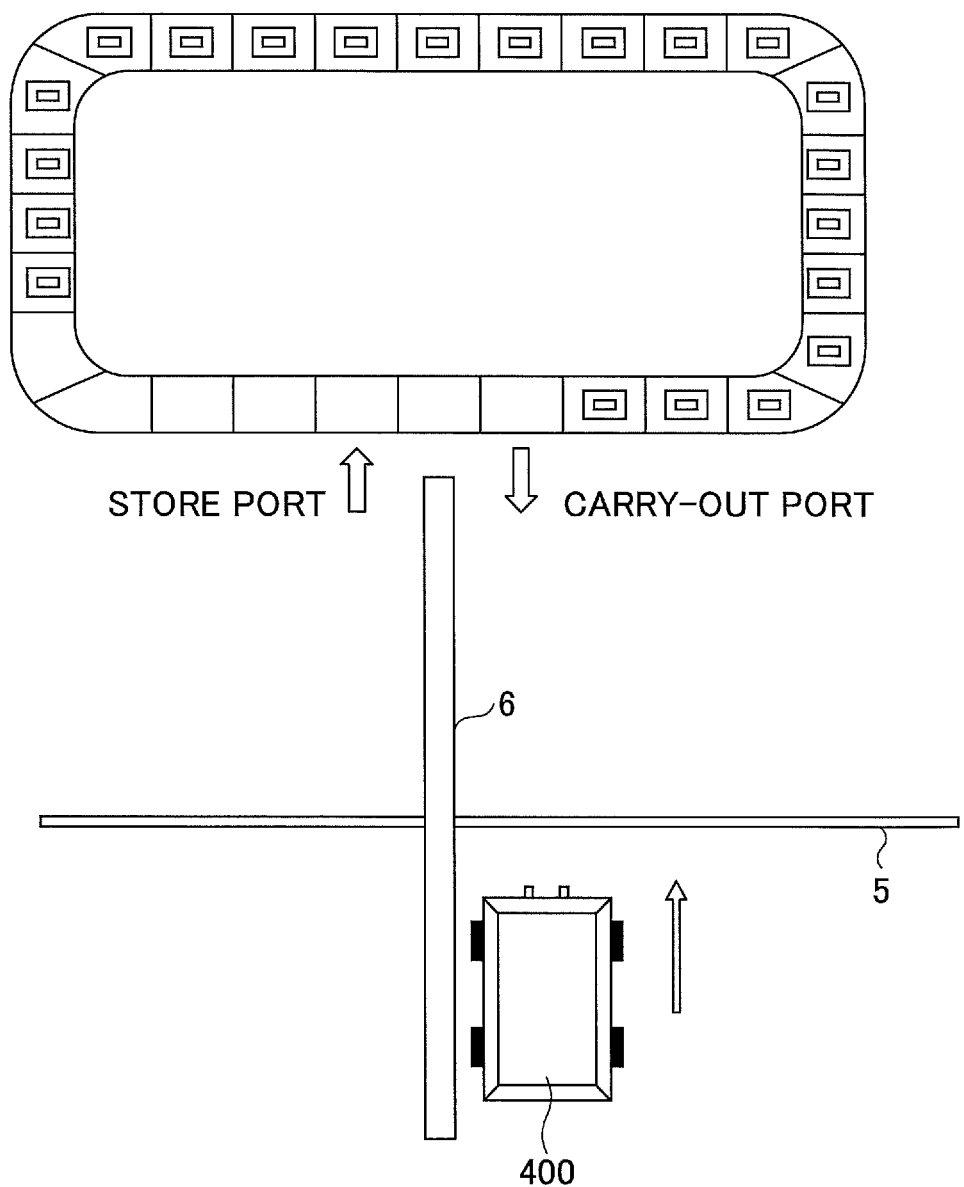
FIG. 3 is a plan view of the conveyor illustrated in FIG. 1.

FIG. 3 is a plan view of the conveyor 1 storing articles thereon. In FIG. 3, articles are stored in some of the rooms formed on the conveyor 1. An automatically controlled forklift 400, which is used to store/carry the articles in/out of the rooms formed on the conveyor 1, is arranged near the conveyor 1. The forklift 400 is controlled by the control apparatus 100. When storing an article, the forklift 400 is controlled to move from a home position before a control start line 5 toward a store port (store location) of the conveyor 1. After storing the article in one of the rooms formed on the conveyor 1, the forklift 400 returns to the home position. When carrying an article out of one of the rooms on the conveyor 1, the forklift 400 is controlled to move from a home position before the control start line 5 toward a carry-out port (carry-out location). After carrying out the article from one of the rooms on the conveyor 1, the forklift 400 is controlled to return to the home position. As illustrated in FIG. 3, a moving path of the forklift 400 to move toward the store port and a moving path of the forklift 400 to move toward the carry-out port are separated by a separation wall 6 installed between the moving paths.

FIGS. 4A and 4B illustrate a control of the control apparatus 100 to operate the conveyor 1 and move the forklift 400 when storing an article in the room No. 10, which is empty and located on the end of the line of the empty rooms. FIG. 4A illustrates a state before the control apparatus 100 controls the conveyor 1 and the forklift 400 when storing an article in the room No. 10, which is empty and located at the end of the line of the empty rooms. When the forklift 400 moves beyond the control start line 5 as illustrated in FIG. 4B, the control apparatus 100 causes the communication devices 200 to acquire information regarding a state of storage of each article in the respective rooms. When storing an article, the control apparatus 100 causes the conveyor 1 to operate so that one of the empty rooms, which is positioned at an end of the line of the empty rooms, moves to the store port.

FIGS. 5A and 5B illustrate a control of the control apparatus 100 to operate the conveyor 1 and move the forklift 400 when carrying an article out of the room No. 5, which stores an article and located on the end of the line of the rooms storing articles. FIG. 5A illustrates a state before the control apparatus 100 controls the conveyor 1 and the forklift 400 when carrying the article out of the room No. 5, which is storing the article and located at the end of the line of the rooms storing articles. When the forklift 400 moves beyond the control start line 5 as illustrated in FIG. 5B, the control apparatus 100 causes the communication devices 200 to acquire information regarding a state of storage of each article in the respective rooms. When carrying-out an article, the control apparatus 100 causes the conveyor 1 to operate so that one of the rooms storing the article, which is positioned at an end of the line of the rooms storing articles, moves to the carry-out port.

In the above-mentioned example, the control apparatus 100 controls the conveyor 1 to move in opposite directions when storing and carrying out an article.

Figure 6:
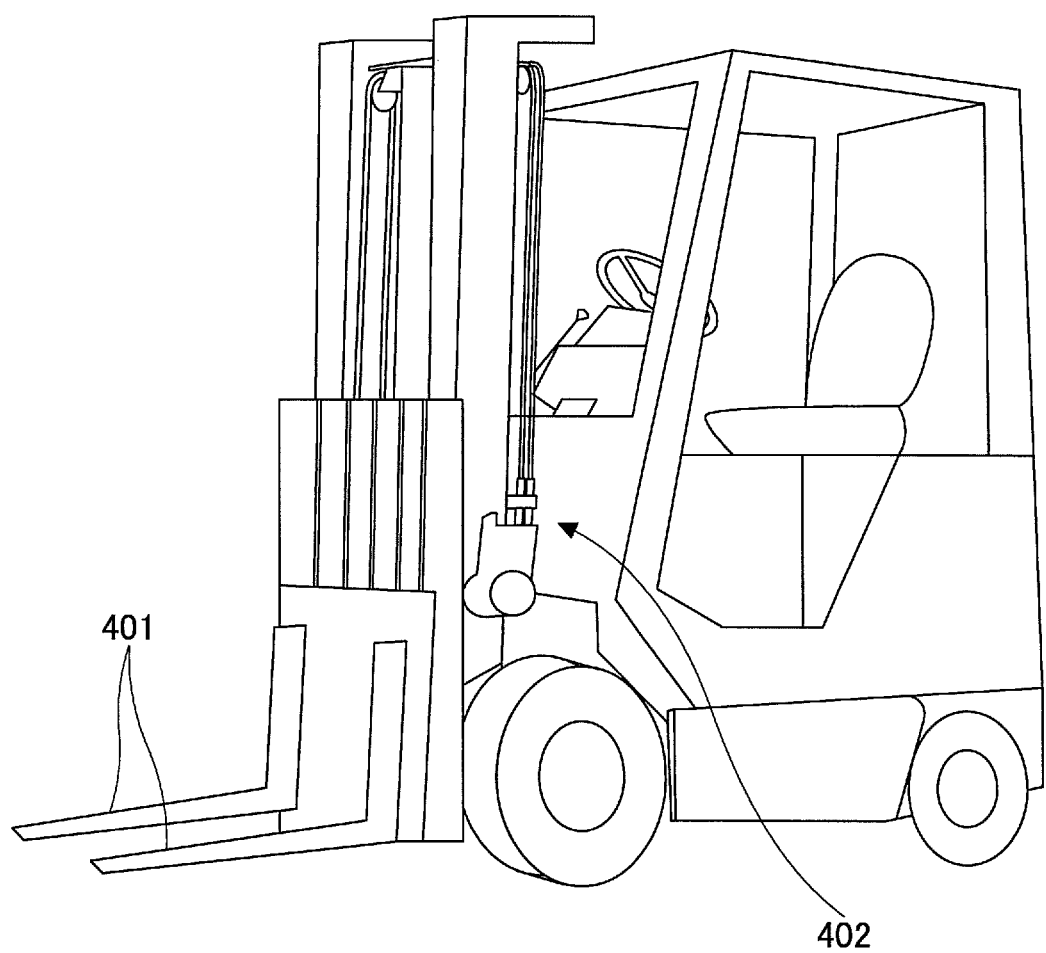
FIG. 6 is a side view of a forklift illustrated in FIGS. 4A through 5B.

FIG. 6 is a side view of the forklift 400 illustrated in FIGS. 3 through 5B. The forklift 400 moves and operates under the control of the control apparatus 100. The forklift 400 has a pair of claw plates 401 that are movable vertically by a hydraulic mechanism 402 provided in the forklift 400. The pair of claw-plates 401 are inserted into the respective claw-plate insertion slots 4a (refer to FIG. 2) so as to lift up the article-placing board 4 by operating the hydraulic mechanism 402 and convey an article placed on the article-placing board 4.

A description is given below of details of the control apparatus 100 and the communication device 200.

(Hardware Structure)

Figure 7:
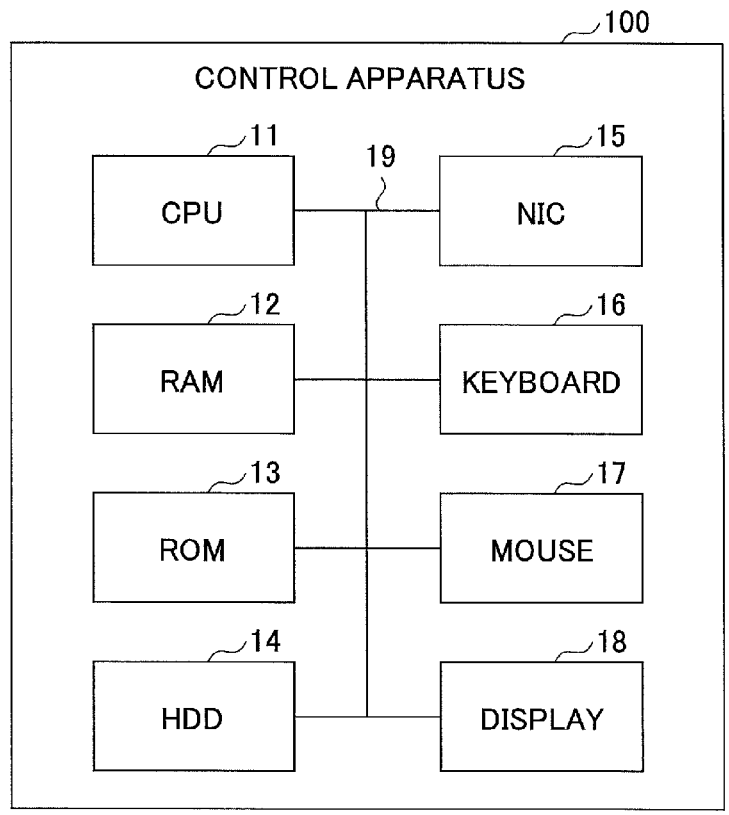
FIG. 7 is a hardware block diagram of a control apparatus according to an embodiment of the present invention.
Figure 8:
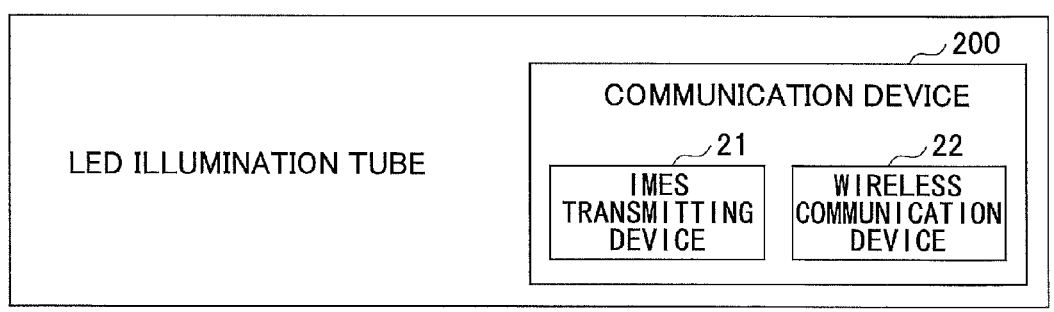
FIG. 8 is a hardware block diagram of a communication apparatus according to the embodiment of the present invention.

First, a description is given, with reference to FIGS. 7 and 8, of hardware structures of the control apparatus 100 and the communication device 200.

FIG. 7 is a block diagram of a hardware structure of the control apparatus 100. The control apparatus 100 is a computer including a CPU 11, a RAM 12, a ROM 13, an HDD 14, an NIC 15, a keyboard 16, a mouse 17 and a display 18 that are electrically connected by a bus 19.

The CPU 11 executes a program to perform an operation control process of the control apparatus 100. The RAM 12 is used as a work area of the CPU. The ROM 13 stores a system program of the control apparatus 100. The HDD 14 stores application programs executed in the control apparatus 100 and inventory information indicating an inventory status of articles. The NIC 15 is a device for communicating with an external apparatus such as a forklift and a conveyor through a network such as the Ethernet (registered trademark) or the like. The keyboard 16 and the mouse 17 are devices for receiving an input by a use. The display 18 is a device for visually presenting an output of the control apparatus 100 to a user.

According to the above-mentioned structure, the control apparatus 100 is capable of controlling the forklift 400 and the conveyor 1 through a network. Additionally, the control apparatus 100 is capable of recognizing an inventory status of articles based on information sent from the communication devices 200 provided to the conveyor 1.

(Communication Device)

FIG. 8 is a block diagram of a hardware structure of the communication device 200. As illustrated in FIG. 8, the communication device 200 is provided by being incorporated in, for example, an LED illumination tube. The communication device 200 includes an IMES transmitting device 21 and a wireless communication device 22.

The IMES transmitting apparatus 21 transmits a position-measuring signal according to a frame format defined by, for example, the IMES standard. More specifically, the IMES transmitting device 21 creates a signal by modulating 1.5 GHz carrier wave by using data having a frame structure defined by the IMES standard, and transmits the created signal through an antenna. The wireless communication device 22 is a device for communicating with articles and the gateway 300 by using the Bluetooth (registered trademark), the ZigBee (registered trademark), the WiFi (registered trademark), etc.

According to the above-mentioned structure, the communication device 200 is capable of transmitting a position-measuring signal in the room in which an article can be stored, receiving a response from an article which received the position-measuring signal, recognizing existence or non-existence of an article in the room, and notifying the control apparatus 100 of the state of the article in the room. It should be noted that the communication device 200 may include a CPU, a RAM and a ROM to materialize the following function by executing a program by the CPU.

Although not illustrated in the figure, an article such as, for example, an image forming apparatus may be equipped with a wireless communication device for transmitting a response by wireless communication so that the article can receive position-measuring signal from the communication apparatus 200 and transmit a response to the communication device 200. Alternatively, instead of the position-measuring signal receiving device and the wireless communication device being incorporated into an article, an external terminal having these devices may be provided to an article.

(Function)

Figure 9:
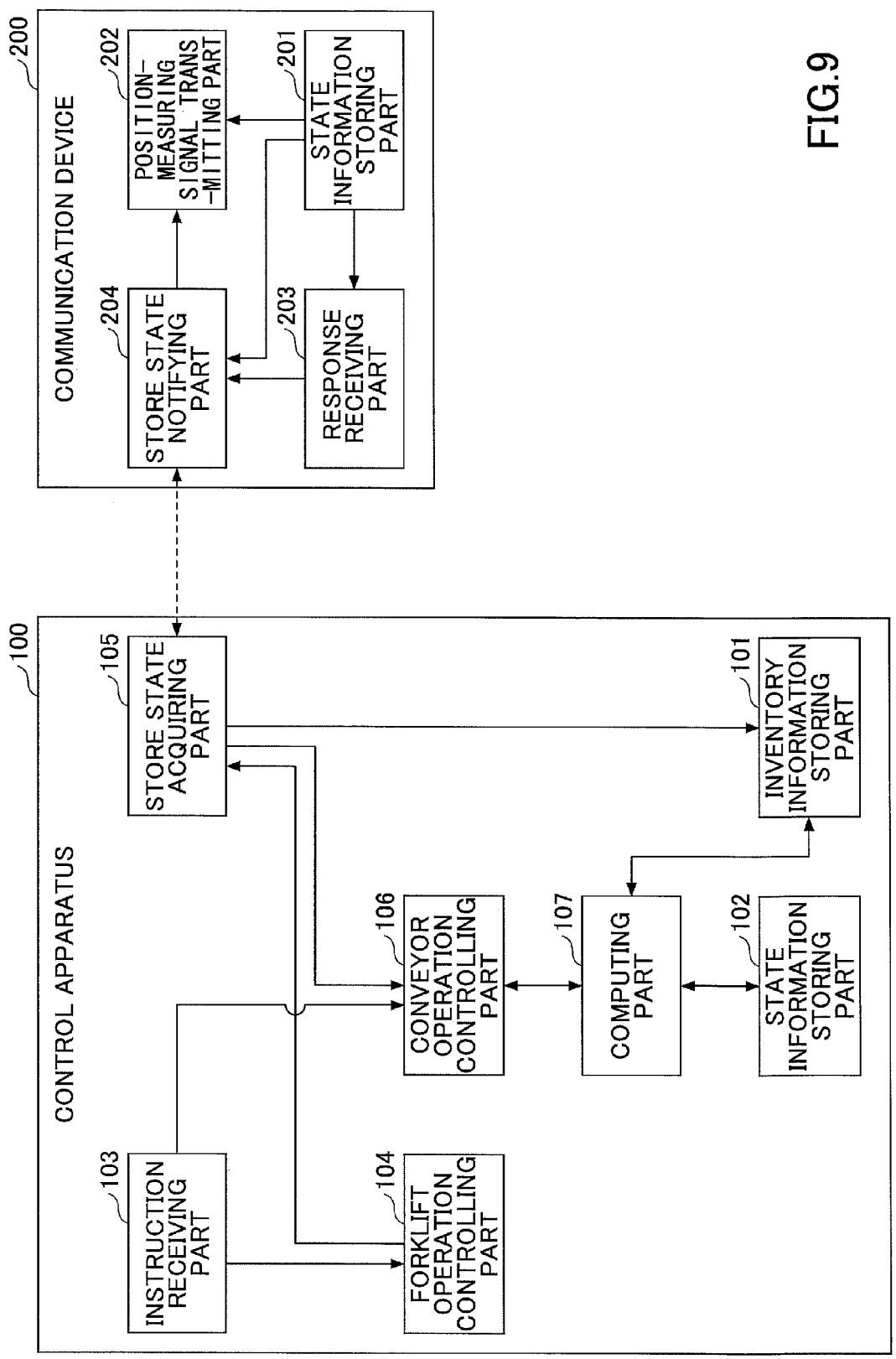
FIG. 9 is a functional block diagram of the control apparatus according to the embodiment of the present invention.

A description is given below, with reference to FIG. 9, of functions of the control apparatus 100 and the communication device 200. FIG. 9 illustrates functional parts of the control apparatus 100 and the communication device 200.

(Control Apparatus)

The control apparatus 100 includes an inventory information storing part 101, a state information storing part 102, an instruction receiving part 103, a forklift operation controlling part 104, a storage state acquiring part 105, a conveyor operation controlling part 106 and a computing part 107.

The inventory information storing part 101 may be materialized by the HDD 14 illustrated in FIG. 7. The inventory information storing part 101 stores inventory information to manage a state of storage of an article in each room on the conveyor 1.

FIG. 10 illustrates a table for storing inventory information. The inventory information storing part 101 stores identification information and information regarding a state of storage by associating with each other as illustrated in FIG. 10. The identification information is information for identifying each room. In the example illustrated in FIG. 10, an identification number (ID) of the communication device 200 provided to each room is stored. The identification information corresponds to a room number assigned to each room formed on the conveyor 1 as illustrated in FIGS. 4A and 4B and FIGS. 5A and 5B. The information regarding a state of storage indicates whether an article is stored in each room. In the example of FIG. 10, the state where an article is stored is represented by "1", and the state where an article is not stored is represented by "0".

The state information storing part 102 may be materialized by the HDD 14 illustrated in FIG. 7. The state information storing part 102 stores state information representing the identification information of two rooms located at the store port and the carry-out port. FIG. 11 illustrates a table for storing the state information. The state information illustrated in FIG. 11 indicates a state of the conveyor 1 illustrated in FIG. 4A. That is, the state information illustrated in FIG. 11 indicates that the room having identification information (room number) "7" is located at the store port and the room having identification information (room number) "5" is located at the carry-out port.

The instruction receiving part 103 may be materialized by a process performed by the CPU 11 and the keyboard 16 or the mouse 17 to receive an instruction from a user to store or carry-out a particular article. The instruction receiving part 103 notifies the forklift operation controlling part 104 and the conveyor operation controlling part 106 that the instruction to store or carry-out is received from a user.

The forklift operation controlling part 104 may be materialized by a process performed by the CPU 11 and the NIC 15 illustrated in FIG. 7. The forklift operation controlling part 104 controls an operation of the forklift 400 in accordance with an instruction sent from a user. Upon reception of the instruction to store or carry out, the forklift operation controlling part 104 causes the forklift 400 to move to the store port or the carry-out port. When the forklift operation controlling part 104 detects that the forklift 400 passed through the control start line 5 drawn at a position before the store port or the carry-out port (refer to FIG. 3 through 5B), the forklift operation controlling part 104 notifies the store state acquiring part 105 of the detection of the control start line 5. Then, the forklift operation controlling part 104 controls the forklift 400 to store an article in the room through the store port or carry an article out of the room though the carry-out port. Thereafter, the forklift operation controlling part 104 controls the forklift 400 to return to the home position.

It should be noted that the forklift operation controlling part 104 can detect that the forklift 400 crossed the control start line 5 by a sensor attached to a lower part of the forklift 400.

The store state acquiring part 105 may be materialized by a process of the CPU 11 and the NIC 15 illustrated in FIG. 7. The store state acquiring part 105 sends a store state notification instruction to each communication device 200 in response to a notification sent from the forklift operation controlling part 104. Then, the store state acquiring part 105 acquires the identification information and the information regarding a state of storage from each communication device 200 as a response to the store state notification instruction. The identification information is to identify the each communication device 200 and to identify each room. The information regarding a state of storage indicates whether an article is stored in the room in which the communication device 200 is installed. The store state acquiring part 105 searches for the inventory information stored in the inventory information storing part 101 by using the identification information received from the communication device 200 as a key, and updates the information regarding a state of storage of a retrieved entry by the information of a state of storage received from the communication device 200. Additionally, after acquiring the information regarding a state of storage from all of the communication devices 200, the store state acquiring part 105 notifies the conveyor operation controlling part 106 that the information regarding a state of storage is acquired from all of the communication devices 200.

The conveyor operation controlling part 106 may be materialized by a process performed by the CPU and the NIC 15 illustrated in FIG. 7. Upon reception of the notification from the store state acquiring part 105, the conveyor operation controlling part 106 transfers the contents ("store" or "carry-out") of the instruction received from the instruction receiving part 103 to the computing part 107 and instructs the computing part 107 to compute an amount of travel of the conveyor 1. Then, the conveyor operation controlling part 106 controls the conveyor 1 to operate in accordance with the amount of travel of the conveyor 1 received from the computing part 107. It should be noted that, when the contents of the instruction is "store", the conveyor operation controlling part 106 causes the conveyor 1 to travel in the counterclockwise direction (refer to FIGS. 4A and 4B). On the other hand, when the contents of the instruction is "carry-out", the conveyor operation controlling part 106 causes the conveyor 1 to travel in the clockwise direction (refer to FIGS. 5A and 5B).

The computing part 107 may be materialized by a process performed by the CPU 11 illustrated in FIG. 7. Upon reception of the contents of the instruction from the conveyor operation controlling part 106, the computing part 107 reads the inventory information from the inventory information storing part 101, and also reads the state information from the state information storing part 102. Then, the computing part 107 computes an amount of travel of the conveyor 1 in accordance with the contents of instruction, as follows.

If the contents of instruction indicate "store", the computing part 107 computes an amount of travel of the conveyor 1 required for moving one of the rooms each of which has not stored an article, that is, the rooms having the information regarding a state of storage indicates "0", to the store port, the one of the rooms being at a trailing end of a line of the rooms each of which has not stored an article, that is, empty rooms. In the example of FIGS. 4A and 4B, the room number of the trailing one of the rooms each of which has not stored an article is "10" and the room number of the trailing one of the rooms each of which has already stored an article is "4". Explaining the case where the the conveyor 1 and the rooms having room numbers illustrated in FIGS. 4A and 4B, the conveyor 1 should be moved in the counterclockwise direction by a distance corresponding to three rooms in order to move the room having the room number "10" to the position of the store port. Thus, the computing part 107 transfers the amount of travel "3" to the conveyor operation controlling part 106. As illustrated in FIGS. 4A and 4B, the room numbers are assigned in an ascending order in the clockwise direction. Thus, if it is determined to move the conveyor 1 in the counterclockwise direction when storing an article, the computing part 107 computes an amount of travel of the conveyor 1 by subtracting the identification information (room number "7") of the room located at the store port from the identification information (room number "10") of the leading one of the rooms each of which has not stored an article. It should be noted that if the computed value of the amount of travel of the conveyor 1 is a negative value, a total number of all rooms on the conveyor 1 should be added to the computed value.

If the contents of instruction indicate "carry-out", the computing part 107 computes an amount of travel of the conveyor 1 required for moving one of the rooms, each of which has already stored an article, that is, the rooms having the information regarding a state of storage indicates "1", to the carry-out port, the one of the rooms being at a leading end of a line of the rooms each of which has already stored an article. In the example of FIGS. 5A and 5B, the room number of the leading one of the rooms each of which has not stored an article is "14" and the room number of the leading one of the rooms each of which has already stored an article is "5". Explaining the case where the conveyor 1 and the rooms having room numbers illustrated in FIGS. 5A and 5B, the conveyor 1 should be moved in the clockwise direction by a distance corresponding to three rooms in order to move the room having the room number "5" to the position of the carry-out port. Thus, the computing part 107 transfers the amount of travel "3" to the conveyor operation controlling part 106. As illustrated in FIGS. 5A and 5B, the room numbers are assigned in an ascending order in the clockwise direction. Thus, if it is determined to move the conveyor 1 in the clockwise direction, the computing part 107 computes an amount of travel of the conveyor 1 by subtracting the identification information (room number "5") of the leading one of the rooms each of which has already stored an article from the identification information (room number "8") of the room located at the carry-out port. It should be noted that if the computed value of the amount of travel of the conveyor 1 is a negative value, a total number of all rooms on the conveyor 1 is added to the computed value.

According to the above mentioned function, the control apparatus 100 is capable of moving the conveyor 1 after recognizes a present state of storage of each room and storing or carrying out an article.

(Communication Device)

Referring to FIG. 9, the communication device 200 includes an identification information storing part 201, a position-measuring signal transmitting part 202, a response receiving part 203 and a store state notifying part 204.

The identification information storing part 201 is materialized by a memory (not illustrated in the figure) such as a ROM. The identification information storing part 201 stores identification information uniquely provided to each communication device 200. The identification information may be, for example, a room number of each room in which the communication device 200 is installed.

The position-measuring signal transmitting part 202 is materialized by the IMES transmitting apparatus 21 illustrated in FIG. 8. Upon receipt of a notification from the store state notifying part 204, the position-measuring signal transmitting part 202 transmits a position-measuring signal defined by, for example, the IMES standard to the interior of the corresponding room. Here, the position-measuring signal transmitting part 202 may transmit a position-measuring signal containing identification information stored in the identification information storing part 201. For example, the position-measuring signal transmitting part 202 may transmit a position-measuring signal by storing the identification information in an area of a short ID or a medium ID defined in the IMES standard.

The response receiving part 203 is materialized by the wireless communication device 22 illustrated in FIG. 8. The response receiving part 203 receives a response from the article, which received the position-measuring signal, through wireless communication. Upon receipt of the response, the response receiving part 203 notifies the store state notifying part 204 that the response is received.

The response from the article may include the identification information, which the article received through the position-measuring signal. The response receiving part 203 can determine that the response is sent from the article stored in the room in which the communication device 200 is installed by checking whether the identification information contained in the response coincides with the identification information stored in the identification information storing part 201. At this time, if the identification information contained in the response does not coincide with the identification information stored in the identification information storing part 201, the response receiving part 203 may ignore the received response.

The store state notifying part 204 is materialized by the wireless communication device illustrated in FIG. 8. Upon receipt of a store state notification instruction from the store state acquiring part 105 of the control apparatus 100, the store state notifying part 204 notifies the position-measuring signal transmitting part 202 that the receipt of the store state notification instruction. Additionally, if the store state notifying part 204 receives a response from the response receiving part 203 within a fixed time period after receiving the store state notification instruction, the store state notifying part 204 transmits information indicating that the article has already been stored to the store state acquiring part 105 of the control apparatus 100 together with the identification information. On the other hand, if the store state notifying part 204 does not receive a response from the response receiving part 203 within the fixed time period after receiving the store state notification instruction, the store state notifying part 204 transmits information indicating that the article has not been stored to the store state acquiring part 105 of the control apparatus 100 together with the identification information.

According to the above-mentioned function, the communication device 200 is capable of checking a state of storage of an article in response to the instruction from the control apparatus 100 and transmitting a result of the checking to the control apparatus 100.

(Operation)

A description is given below, with reference to FIGS. 12 and 13, of operations of the control apparatus 100 and the communication device 200.

(Process Flow of Control Apparatus)

Figure 12:
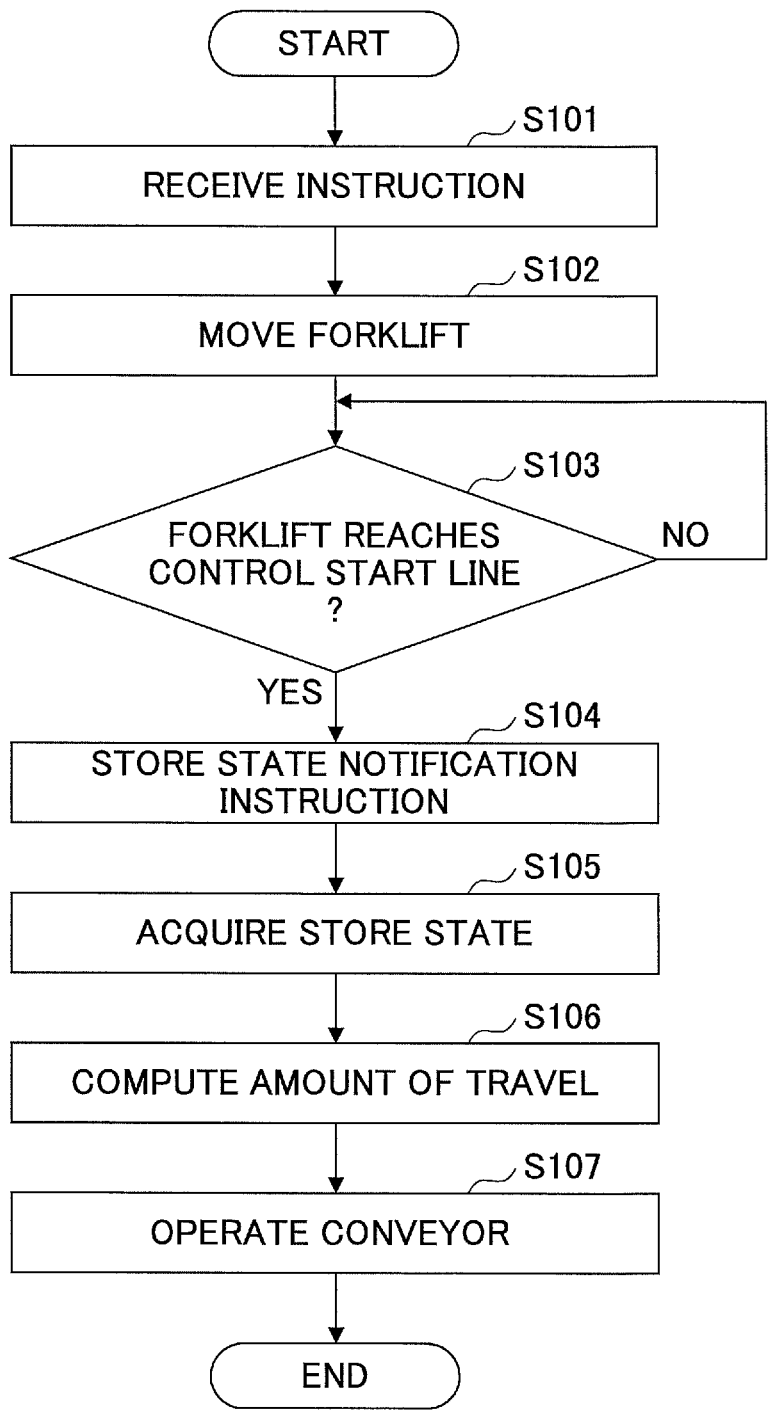
FIG. 12 is a flowchart of a process performed by the control apparatus according to the embodiment of the present invention.

FIG. 12 is a flowchart of a process performed by the control apparatus 100.

First, the instruction receiving part 103 of the control apparatus 100 receives an instruction of "store" or "carry-out" from a user (step S101). Then, the forklift operation controlling part 104 cause the forklift 400 to move to the store port or the carry-out port (step S102). If the forklift operation controlling part 104 detects that the forklift 400 passed through the control start line 5 (YES of step S103), the store state acquiring part 105 sends a store state notification instruction to each communication device 200 (step S104). On the other hand, if the forklift operation controlling part 104 does not detect that the forklift 400 passed through the control start line 5 (NO of step S103), the process returns to step S103.

After the process of step S104 is performed, the store state acquiring part 105 acquires information regarding a state of storage from each communication device 200 as a response to the store state notification instruction (step S105). Then, the computing part 107 computes an amount of travel of the conveyor 1 based on the inventory information stored in the inventory information storing part 101 and the state information stored in the state information storing part 102 (step S106). Then, the conveyor operation controlling part 106 causes the conveyor 1 to operate in accordance with the amount of travel received from the computing part 107 (step S107).

According to the above-mentioned process, the control apparatus 100 is capable of recognizing a state of storage of each room before the forklift 400 reaches the store port or the carry-out port and controlling the conveyor 1 to move the room, into which an article is stored or from which an article is carried out, to the position of the store port or the carry-out port.

(Operation of Entire Control System)

FIG. 13 is a sequence chart of an operation of the entire control system. In the following explanation, it is assumed that the position of the conveyor 1 and the state of storage of the article are that illustrated in FIG. 4A and a user sends an instruction to store the article.

First, the instruction receiving part 103 of the control apparatus 100 receives an instruction of "store" from a user (step S201). The instruction receiving part 103 notifies the forklift operation controlling part 104 that the instruction of "store" is received (step S202). Then, the forklift operation controlling part 104 controls the forklift 400 to move to the store port (step S203). Thereafter, the forklift operation controlling part 104 detects that the forklift 400 passed through the control start line 5 illustrated in FIG. 4B by receiving from a sensor provided to the forklift 400 a notification indicating that the control start line 5 is detected (step S204). Then, the forklift operation controlling part 104 notifies the store state acquiring part 105 that the forklift 400 passed through the control start line 5 (step S205).

Upon receipt of the notification from the forklift operation controlling part 104, the store state acquiring part 105 sends a store state notification instruction to all of the communication devices 200 installed in the rooms of the conveyor 1 (step S206). This store state notification instruction is transmitted to each of the communication devices 200 through the gateway 300 by wireless communication.

Upon receipt of the store state notification instruction, the sore state notifying part 204 of each communication devices 200 notifies the position-measuring signal transmitting part 202 that the store state notification instruction is received (step S207). The position-measuring signal transmitting part 202 reads the identification information (here, one of numbers "1" to "28") stored n the identification information storing part 201 (step S208). Then, the position-measuring signal transmitting part 202 transmits a position-measuring signal containing the identification information to the interior of the room as a radio-frequency signal according to, for example, the IMES standard (step S209).

The response receiving part 203 of the communication apparatus 200 receives a response containing the identification information stored in the identification information storing part 201 from the article that received the position-measuring signal or a device attached to the article (step S210). Upon receipt of the response, the response receiving part 203 notifies the store state notifying part 204 that the response is received (step S211). Upon receipt of the notification, the store state notifying part 204 reads the identification information from the identification information storing part 201 (step S212). Then, the store state notifying part 204 transmits the identification information and the information regarding a state of storage indicating the the article has already been stored to the control apparatus 100 through the gateway 300 by wireless communication (step S213).

The store state acquiring part 105 of the control apparatus 100 updates the inventory information of the inventory information storing part 101 by using the identification information and the information regarding a state of storage that are received from all of the communication apparatuses 200 (step S214). The updated inventory information is the same as that illustrated in FIG. 10. The store state acquiring part 105 notifies the conveyor operation controlling part 106 that the update of the inventory information has completed (step S215).

Upon receipt of the notification from the store state acquiring part 105, the conveyor operation controlling part 106 of the control apparatus 100 instructs the computing part 107 to compute an amount of travel of the conveyor 1 (step S216). At this time, the conveyor operation controlling part 106 notifies the computing part 107 that the contents of the instruction are "store". In response to the instruction from the conveyor operation controlling part 106, the computing part 107 reads the inventory information from the inventory information strong part 101 (step S217), and also reads the state information from the state information storing part 102 (step S218).

Then, because the contents of the instruction are "store", the computing part 107 of the control apparatus 100 computes a number "3" as an amount of travel by subtracting the identification information "7" of the room positioned at the store port from the identification information "10" of the trailing one of the line of rooms each of which has not stored an article (step S219). Then, the computing part 107 transfers the computed amount of travel "3" to the conveyor operation controlling part 106 (step S220).

Then, because the contents of the instruction are "store", the conveyor operation control part 106 of the control apparatus 100 causes the conveyor 1 to move in the counterclockwise direction by a distance corresponding to three "3" rooms (step S221). Thereafter, the forklift 400 is operated to store the article in the room located at the store port.

According to the above-mentioned process performed in the control system, the FIFO of articles can be applied. Thus, for example, a variation in lending frequency of articles, which are used in rental business, on an individual article basis can be omitted.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitable programmed apparatuses such as a general purpose computer, personal digital assistant (PDA), mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as flexible magnetic disk, hard disk, CD-ROM, magnetic tape device or solid state memory device.

The computer software can be provided to the programmable apparatus using any non-transient recording medium for recording processor readable code, such as a flexible magnetic disk, hard disk, CD-ROM, magnetic tape, solid-state memory, etc.

The hardware platform encompasses any suitable hardware resources including, for example, a central processing unit (CPU), random access memory (RAM), hard disc drive (HDD), etc. The CPU can be configured by any suitable types and numbers of processors. The RAM can be configured by any suitable volatile or non-volatile memory. The HDD can be configured by any suitable non-volatile memory that can record a large amount of data. The hardware resources may further be equipped with an input device, output device or network device in conformity with the device type. The HDD may be provided outside the apparatus as long as it can be accessed. In such an example, the CPU and RAM like a cache memory of CPU can serve as a physical memory or main memory of the apparatus, whereas the HDD can serve as a secondary memory of the apparatus.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A control apparatus controlling a circulating conveyor having a plurality of areas each of which stores one of a plurality of articles, the control apparatus comprising:
    a storage storing inventory information indicating a state of storage of one of the article in each of the areas, said inventory information including an ability for each of the areas to store the one of the plurality of articles; and
    a computer executing a program to perform a controlling process of controlling an operation of the conveyor,
    wherein the controlling process includes:
    a receiving process of receiving instructions of storing and carrying out one of the articles;
    a computing process of computing, in response to reception of the instruction by the receiving process, an amount of travel of the conveyor based on the inventory information, the amount of travel being necessary to move one of the areas of the conveyor to a predetermined position at which one of the articles is stored in or carried out of the one of the areas; and
    a first controlling process of controlling an operation of the conveyor in accordance with the amount of travel computed by the computing process,
    wherein the inventory information includes information indicating which one of the plurality of areas is an end of one or more empty areas and information indicating which one of the plurality of areas is an end of one or more areas that store the articles.

2. The control apparatus as claimed in claim 1, wherein the first controlling process causes the conveyor to circulate in different directions between a case of storing one of the articles in one of the areas and a case of carrying one of the articles out of one of the areas, and
    when the receiving process receives the instruction of storing one of the articles, the computing process identifies a particular one of the areas in which neither of the articles is stored, the particular one of the areas located at a minimum distance from the predetermined position on the conveyor, and computes the minimum distance as the amount of travel of the conveyor.

3. The control apparatus as claimed in claim 1, wherein, when the receiving process receives the instruction of carrying out one of the articles, the computing process identifies a particular one of the areas in which the articles are stored, the particular one of the areas located at a minimum distance from the predetermined position on the conveyor, and computes the minimum distance as the amount of travel of the conveyor.

4. The control apparatus as claimed in claim 1, wherein the controlling process further includes an acquiring process of acquiring information regarding a state of storage of the articles from a communication device installed in each of the areas.

5. The control apparatus as claimed in claim 4, wherein the communication device is provided in an illumination tube provided to each of the areas.

6. The control apparatus as claimed in claim 4, wherein the storage stores inventory information, which relates identification information of the communication device and the information regarding a state of storage acquired by the acquiring process to each other, and the computing process computes the amount of travel of the conveyor by using the inventory information.

7. The control apparatus as claimed in claim 6, wherein the identification information of the communication device is transmitted from the communication device by being contained in a position-measuring signal according to an IMES standard.

8. The control apparatus as claimed in claim 4, wherein the controlling process further includes a second controlling process of controlling an operation of a forklift to store one of the articles in one of the areas,
    the second controlling process controls an operation of the forklift in response to the instruction received by the receiving process, and
    the acquiring process acquires the information regarding a state of storage in response to the forklift moving to the predetermined position.

9. The control apparatus as claimed in claim 8, wherein the first controlling process causes the conveyor to complete the operation before the forklift reaches the predetermined position.

10. A control system comprising:
    a control apparatus controlling a circulating conveyor having a plurality of areas each of which stores one of a plurality of articles; and
    a communication device provided in each of the areas,
    wherein the control apparatus includes:
    a storage storing inventory information indicating a state of storage of the article in each of the areas, said inventory information including an ability for each of the areas to store the one of the plurality of articles; and
    a computer executing a program to perform a controlling process of controlling an operation of the conveyor,
    wherein the controlling process includes:
    a receiving process of receiving instructions of storing and carrying out an article;
    a computing process of computing, in response to reception of the instruction by the receiving process, an amount of travel of the conveyor based on the inventory information, the amount of travel being necessary to move one of the areas of the conveyor to a predetermined position at which one of the articles is stored in or carried out of the one of the areas; and
    a first controlling process of operating the conveyor in accordance with the amount of travel computed by the computing process,
    wherein the communication device transmits information regarding a state of storage of one of the articles in response to an instruction transmitted by the receiving process,
    wherein the inventory information includes information indicating which one of the plurality of areas is an end of one or more empty areas and information indicating which one of the plurality of areas is an end of one or more areas that store the articles.

11. A control method executed by a control apparatus, which controls a circulating conveyor having a plurality of areas each of which stores one of a plurality of articles, the control method comprising:
    receiving an instruction of storing or carrying out an article;
    computing, in response to reception of the instruction by the receiving process, an amount of travel of the conveyor based on inventory information, the amount of travel being necessary to move one of the areas of the conveyor to a predetermined position at which one of the articles is stored in and carried out of the one of the areas, said inventory information including an ability for each of the areas to store the one of the plurality of articles; and controlling the conveyor to operate in accordance with the amount of travel computed by the process of computing, wherein the inventory information includes information indicating which one of the plurality of areas is an end of one or more empty areas and information indicating which one of the plurality of areas is an end of one or more areas that store the articles.

* * * * *